W. J. BLAKESLEE.
MACHINE FOR SAVING SEEDS.
APPLICATION FILED NOV. 19, 1915.
1,229,870.
Patented June 12, 1917.
3 SHEETS—SHEET 3.
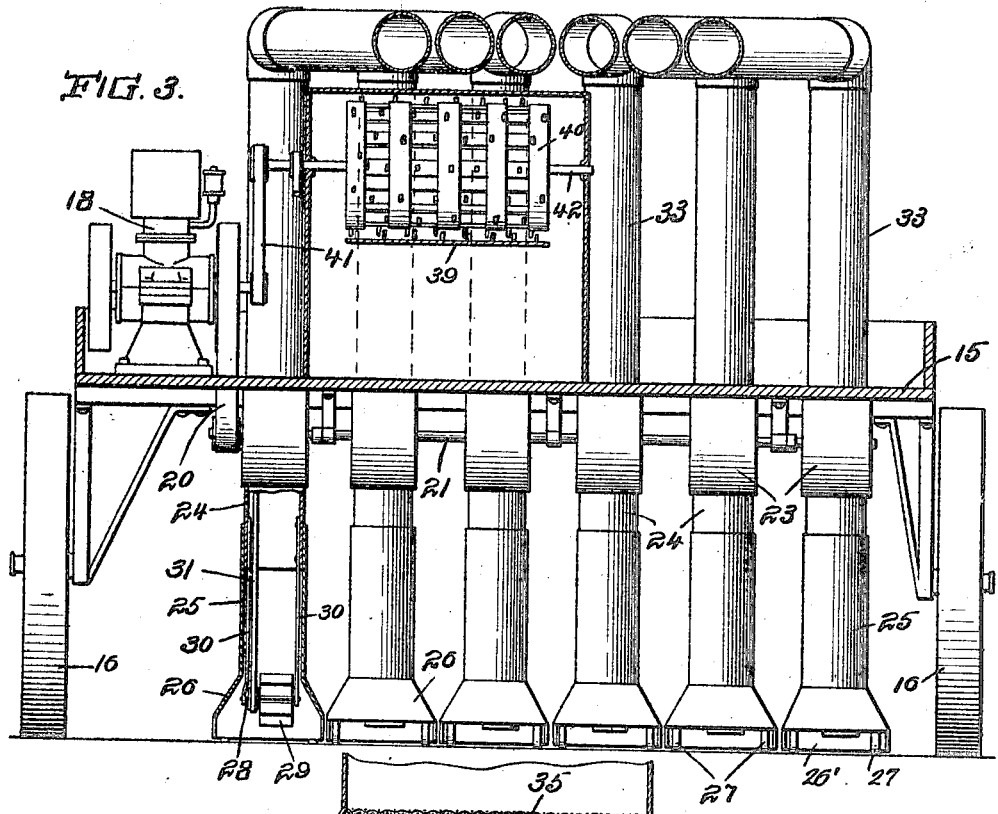
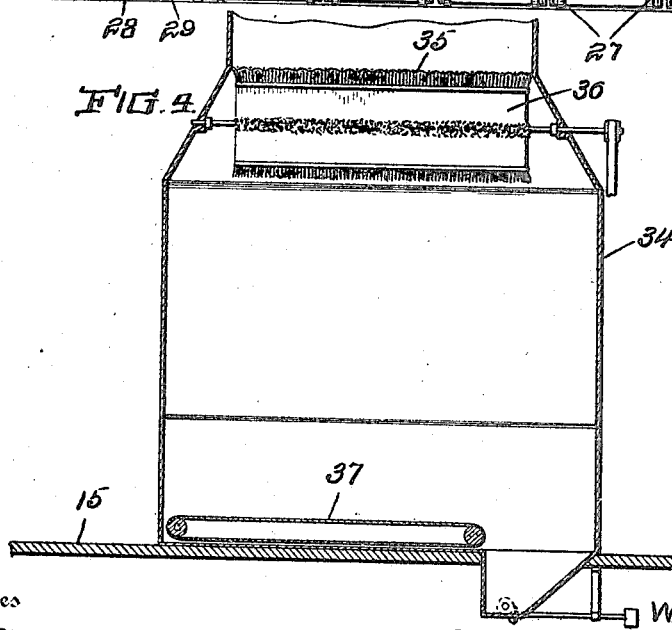
Witnesses
Inventor
W. J. Blakeslee,
By Victor J. Evans
Attorney

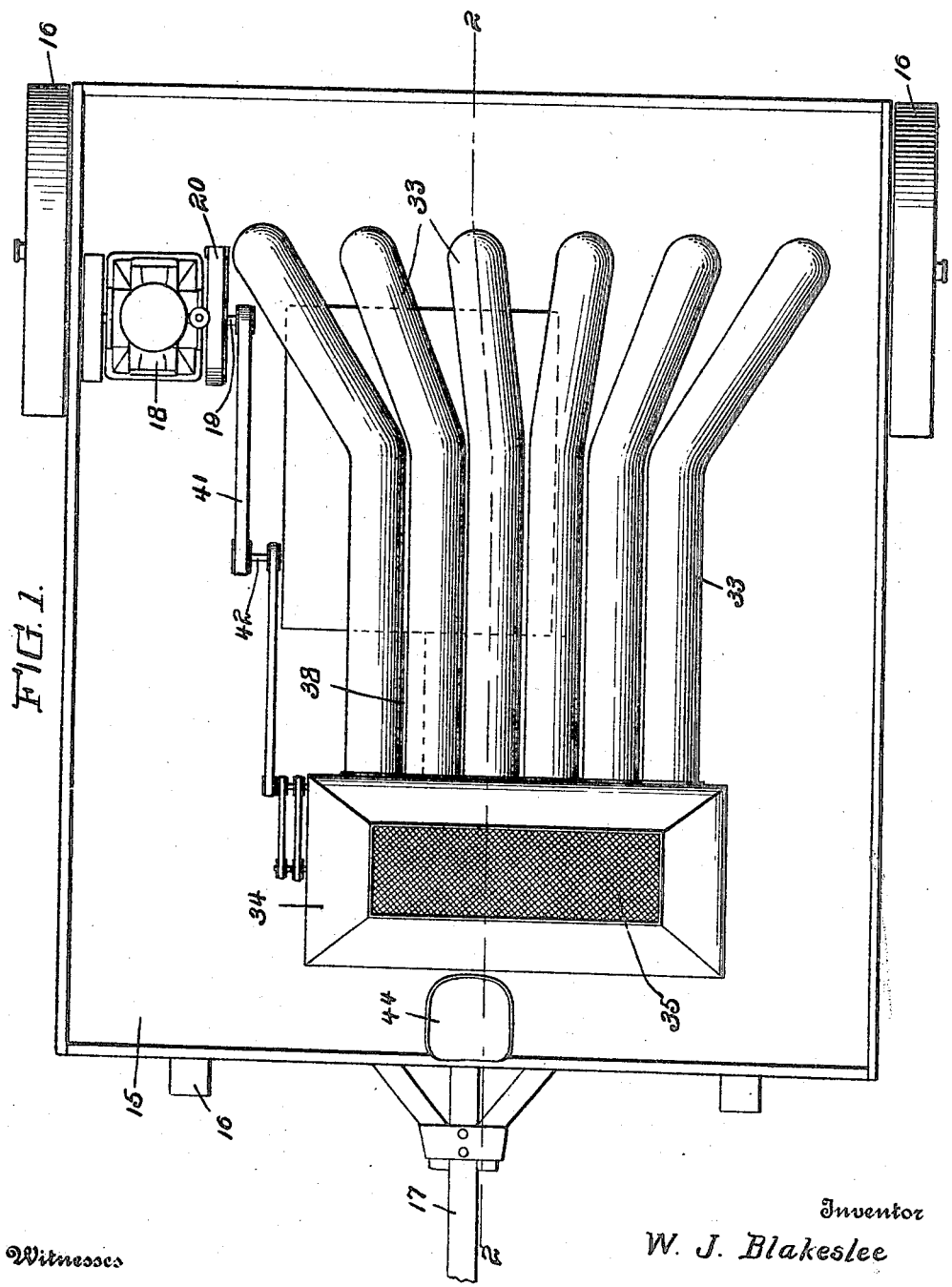

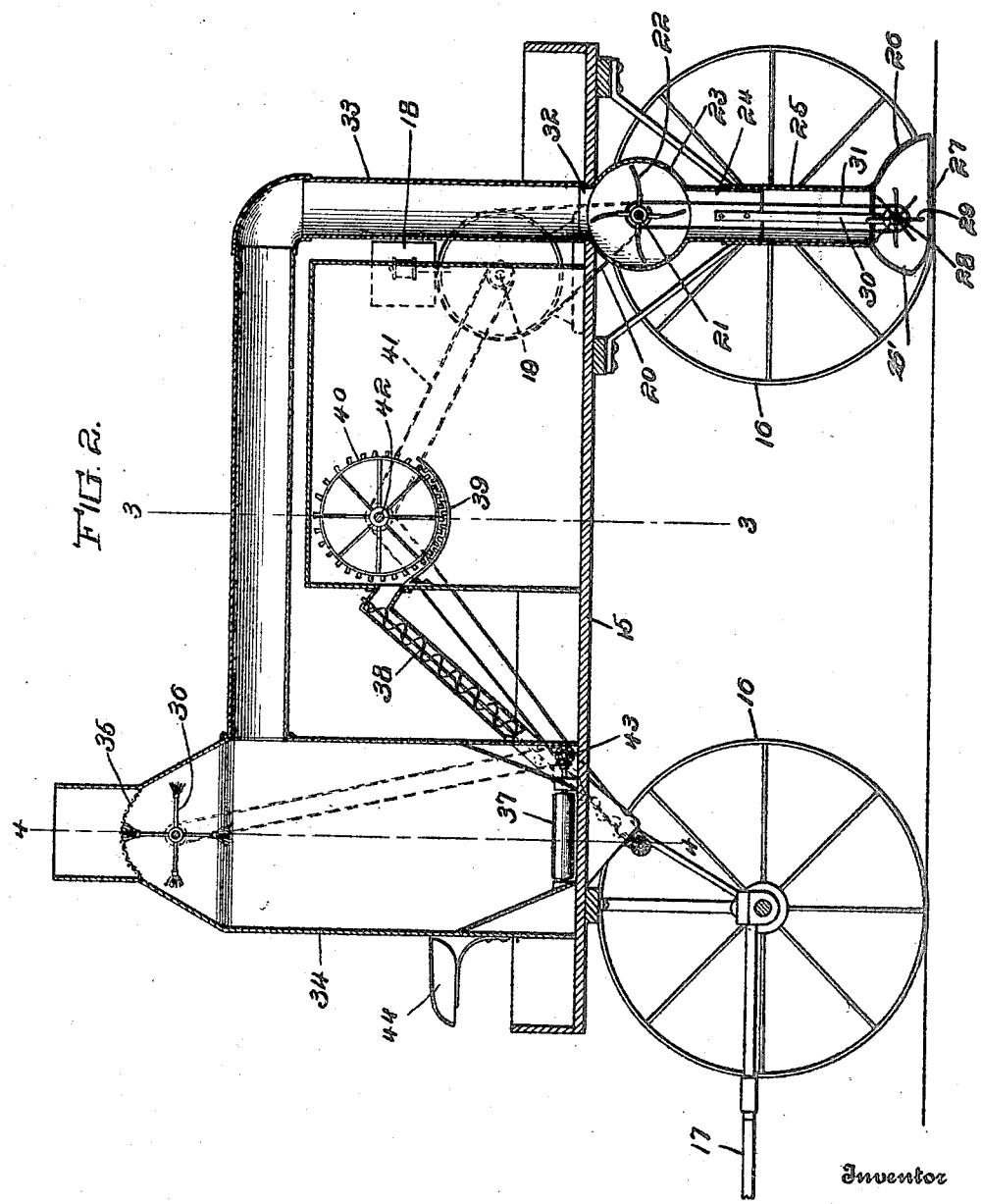

UNITED STATES PATENT OFFICE.

WARD J. BLAKESLEE, OF FILER, IDAHO.

MACHINE FOR SAVING SEEDS.

1,229,870.  Specification of Letters Patent.  Patented June 12, 1917.

Application filed November 19, 1915. Serial No. 62,365.

*To all whom it may concern:*

Be it known that I, WARD J. BLAKESLEE, a citizen of the United States, residing at Filer, in the county of Twin Falls and State of Idaho, have invented new and useful Improvements in Machines for Saving Seeds, of which the following is a specification.

This invention relates to machines for saving seeds that are scattered on the ground during harvest or which have been left behind at the time of harvest.

The invention has for its object to produce a simple, improved and efficient machine equipped with suction mechanism for picking up seeds from the ground and for cleaning the same.

A further object of the invention is to produce a simple and improved organized machine equipped with suction apparatus and with beaters for detaching uncut seed pods from plants, the suction apparatus serving to pick up seeds from the ground and to carry the same along with the detached pods to a cleaning device where dust and the like will be separated from the seeds, the latter and the pods being subsequently subjected to the action of a hulling device.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—

Figure 1 is a top plan view of a machine constructed in accordance with the invention.

Fig. 2 is a longitudinal vertical sectional view taken on the line 2—2 in Fig. 1.

Fig. 3 is a vertical transverse sectional view taken on the line 3—3 in Fig. 2.

Fig. 4 is a vertical transverse sectional view taken on the line 4—4 in Fig. 2.

Corresponding parts in the several figures are denoted by like characters of reference.

The improved machine is mounted for transportation on a platform 15 supported on wheels 16 to enable the machine to be conveniently transported or drawn across a field. The machine may be drawn by animals attached to a pole or tongue 17, or the machine may be motor driven or propelled in any convenient, well known manner.

Supported on the platform 15 is a motor 18 which may be an internal combustion engine of any approved type, said motor having a main driven shaft 19 from which motion is transmitted by means of a belt or band 20 to a shaft 21 arranged in suitable bearings transversely below the rear end of the platform, said shaft carrying a plurality of fans 22 for each of which an independent casing 23 is provided. Each fan casing has an intake spout 24 communicating with the eyes of the fan casing, said spout being extended downwardly, as shown. Each of the spouts 24 is provided with a tubular extension 25 which telescopes thereon and which terminates at its lower end in a ground engaging member consisting of a hood 26 having shoes or runners 27, whereby it is supported. The hood 26 is so shaped that the forward portion thereof will be materially spaced from the ground to form an air inlet 26', while the sides of the hood or the runners connected therewith are in ground engaging position, and the rearward portion of the hood is almost in contact with the ground, this construction, which is clearly seen in Fig. 2, being resorted to in order to enable the hood to pass readily over stubble and the like. Supported for rotation within the hood 26 is a shaft 28 having wings or strippers 29. The shaft 28, which may be mounted for rotation in arms or bracket 30 depending from the spout 24 is driven by power derived by means of a belt or band 31 from the fan carrying shaft 21.

The outlets 32 of the respective fan casings are connected by ducts 33 with a separating bin 34 which is located at the forward portion of the platform 15. The bin 34 has an arcuate top portion 35 of foraminous or reticulated material, such as wire netting, perforated sheet metal or the like, the same being for the purpose of permitting fine dust and the like to escape. Supported for rotation within the bin 34 is a revolving brush 36, whereby the underside of the foraminous top member will be constantly swept and kept clean and free from accumulations of dust. In the bottom of the bin is arranged an endless conveyer 37, whereby material will be conveyed to an elevator 38, whereby such material is conveyed to and deposited on the concave 39 of a hulling device, said hulling device including a revolving toothed cylinder or beater 40. The hulling device, which has been conventionally represented by the concave 39 and the cylinder 40, is to include separating means of well known character for the purpose of grading seeds and separating the same from chaff, coarse impurities and the like. The hulling cylinder may be driven by a belt 41 from the motor shaft 19, and motion may be transmitted from the cylinder shaft 42 to a counter shaft 43 from which the conveyer 37 and the elevator 38, as well as the revolving brush 36, may be driven by transmission means of well known construction. A seat 44 for the driver or operator may be mounted in any suitable location.

In operation, the machine is drawn over the ground while the fans 22 are operated to produce suction in the tubes 24, 25 and in the hoods 26, whereby seeds that have dropped on the ground will be lifted and carried upward together with such seed pods as have been left behind at the harvest time and which are loosened from the stubble by the action of the beaters 29. The material is conveyed from the fan casings through the ducts 33 to the cleaning bin 34 where fine dust and dirt will be blown out through the foraminous top member 35 which is kept clean by the action of the revolving brush 36. The seed along with the pods and comparatively heavy impurities will drop on the conveyer 37, being conveyed thereby to the elevator 38 and by the latter to the hulling device where the seed is cleaned and graded in the customary manner. It will, of course, be understood that any well known hulling and separating mechanism may be employed.

By this improved machine, which is simple in construction and capable of being commercially produced at a moderate expense a large quantity of clover and other seeds may be saved which otherwise would be wasted.

Having thus described the invention, what is claimed as new, is:—

1. In a device of the class described, a seed pick-up consisting of a vertically movable tubular member having a ground engaging hood, a beater supported for rotation within the hood, means for rotating the beater and means for setting up suction in the tubular member.

2. In a device of the class described, a fan casing having an inlet and an outlet spout, a driven fan within the casing, a tubular extension telescoping on the inlet spout and having a ground engaging hood, and a driven revolving beater within the hood.

3. A fan casing having an outlet and an inlet tube, a driven fan in said casing, a tubular extension telescoping on the inlet tube and having a ground engaging hood, and a driven revolving beater supported within the hood on brackets depending from and connected with the inlet tube.

In testimony whereof I affix my signature in presence of two witnesses.

WARD J. BLAKESLEE.

Witnesses:
FRANK FEHRENBOCKE,
SCOTT LORAIN.

Copies of this patent may be obtained for five cents each, by addressing the "Commissioner of Patents, Washington, D. C."